United States Patent
Cox et al.

(10) Patent No.: US 12,399,603 B2
(45) Date of Patent: *Aug. 26, 2025

(54) SYSTEMS AND METHODS FOR THE INTERACTION OF SATELLITE AND INTERNET PROTOCOL FEATURES IN CONTENT DELIVERY SYSTEMS ("Satellite IP Interactions")

(71) Applicant: Sirius XM Radio Inc., New York, NY (US)

(72) Inventors: Stuart A. Cox, Boca Raton, FL (US); Gary John Conners, Belle Mead, NJ (US); Todd Vanzandt, San Dimas, CA (US)

(73) Assignee: Sirius XM Radio Inc., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/602,215

(22) Filed: Mar. 12, 2024

(65) Prior Publication Data

US 2024/0361880 A1    Oct. 31, 2024

Related U.S. Application Data

(63) Continuation of application No. 17/851,172, filed on Jun. 28, 2022, now Pat. No. 11,928,313, which is a (Continued)

(51) Int. Cl.
*H04N 21/218* (2011.01)
*G06F 3/0482* (2013.01)
(Continued)

(52) U.S. Cl.
CPC ............ *G06F 3/0482* (2013.01); *G06N 5/02* (2013.01); *G11B 27/105* (2013.01);
(Continued)

(58) Field of Classification Search
CPC ........ H04H 20/74; H04H 60/72; H04H 60/16; H04H 60/43; H04H 60/19; H04H 60/15;
(Continued)

(56) References Cited

U.S. PATENT DOCUMENTS

2006/0040612 A1* 2/2006 Min .................. H04B 7/18508
455/12.1

* cited by examiner

*Primary Examiner* — Tu X Nguyen
(74) *Attorney, Agent, or Firm* — Herbert Smith Freehills Kramer (US) LLP

(57) ABSTRACT

Systems and methods for interaction of satellite and Internet protocol features in content delivery systems are presented. Using such systems and methods, the delivery of some content to the same product by Satellite delivery, other content by IP de-livery, and still other content by both Satellite and IP delivery can enhance the utility of both the content and the product for an end user and can further optimize the costs and quality of service associated with delivering the content. A method of providing content and data to a combined satellite and IP network receiver is presented, including broadcasting via satellite content and data to the re-ceiver, and sending via an IP based communications network content and data to the receiver, where the content and data provided over the Satellite broadcast enables capabilities of the receiver needed to consume content received by IP delivery, and the content and data provided via IP delivery enables capabilities of the receiver needed to consume content received from the satellite broadcast.

17 Claims, 9 Drawing Sheets

Related U.S. Application Data continuation of application No. 14/232,698, filed as application No. PCT/US2012/046969 on Jul. 16, 2012, now Pat. No. 11,372,521.

(60) Provisional application No. 61/572,332, filed on Jul. 14, 2011.

(51) Int. Cl.

| | |
|---|---|
| *G06N 5/02* | (2023.01) |
| *G11B 27/10* | (2006.01) |
| *H04H 40/90* | (2008.01) |
| *H04L 65/60* | (2022.01) |
| *H04L 65/611* | (2022.01) |
| *H04L 65/612* | (2022.01) |
| *H04L 65/75* | (2022.01) |
| *H04L 67/568* | (2022.01) |
| *H04N 5/76* | (2006.01) |
| *H04N 9/82* | (2006.01) |
| *H04N 21/433* | (2011.01) |
| *H04N 21/4627* | (2011.01) |
| *H04N 21/466* | (2011.01) |
| *H04N 21/472* | (2011.01) |
| *H04N 21/482* | (2011.01) |
| *H04N 21/61* | (2011.01) |
| *H04W 88/06* | (2009.01) |
| *H04N 21/2668* | (2011.01) |
| *H04N 21/439* | (2011.01) |

(52) U.S. Cl.
CPC .............. *H04H 40/90* (2013.01); *H04L 65/60* (2013.01); *H04L 65/611* (2022.05); *H04L 65/612* (2022.05); *H04L 65/765* (2022.05); *H04L 67/568* (2022.05); *H04N 5/76* (2013.01); *H04N 9/8205* (2013.01); *H04N 21/4331* (2013.01); *H04N 21/4627* (2013.01); *H04N 21/4668* (2013.01); *H04N 21/47217* (2013.01); *H04N 21/4821* (2013.01); *H04N 21/4826* (2013.01); *H04N 21/6125* (2013.01); *H04N 21/6143* (2013.01); *H04N 21/6175* (2013.01); *H04N 21/6193* (2013.01); *H04W 88/06* (2013.01); *H04N 21/2668* (2013.01); *H04N 21/439* (2013.01)

(58) Field of Classification Search
CPC ........ H04H 20/95; H04H 20/72; H04H 60/33; H04H 60/66; H04N 21/218; H04N 21/2347; H04N 21/44; H04N 5/445; H04L 9/32
See application file for complete search history.

Fig. 6

| Environment | Available Connections |
|---|---|
| Car Dock | Sat, IP |
| Home Dock | Sat, IP |
| Boombox | Sat, IP |
| Portable | IP |

Table 1 - Available Connections

Fig. 7

| Available Connections | Last tuned channel on: | Last Channel on both IP & Sat? | Initial Tuned Channel |
|---|---|---|---|
| Sat & IP | Sat | (don't care) | Tune to same channel on Sat |
| Sat & IP | IP | (don't care) | Tune to same channel on IP |
| IP Only | Sat | No | Tune to last IP channel [Note1] |
| IP Only | Sat | Yes | Tune to same channel on IP |
| IP Only | IP | (don't care) | Tune to same channel on IP |
| Sat Only | Sat | (don't care) | Tune to same channel on Sat |
| Sat Only | IP | No | Tune to last Sat channel [Note1] |
| Sat Only | IP | Yes | Tune to same channel on Sat |
| None | IP or Sat | (don't care) | Display Home Screen |
| (don't care) | Offline | (don't care) | Continue Offline, or tune [Note2] |

Table 2 - Initial Tuning for Hybrid Connection

Fig. 8

| Available Connections | Last tuned channel on: | Last Channel on both IP & Sat? | Initial Tuned Channel |
|---|---|---|---|
| IP Only | Sat | No | Tune to last IP channel |
| IP Only | Sat | Yes | Tune to same channel on IP |
| IP Only | IP | (don't care) | Tune to same channel on IP |
| None | (don't care) | (don't care) | Display Home Screen |

Table 3 - Initial Tuning When Powering On In Portable Use

FIG. 9

| Available Connections | Last tuned channel on: | Last Channel on both IP & Sat? | Initial Tuned Channel |
|---|---|---|---|
| IP Only | Sat | No | Tune to last IP channel |
| IP Only | Sat | Yes | Tune to same channel on IP |
| IP Only | IP | (don't care) | Tune to same channel on IP |
| None | IP or Sat | (don't care) | Display Home Screen |
| (don't care) | Offline | (don't care) | Continue Offline playback |

Table 4 - Initial Tuning When Removing Operating Product From A Dock

SYSTEMS AND METHODS FOR THE INTERACTION OF SATELLITE AND INTERNET PROTOCOL FEATURES IN CONTENT DELIVERY SYSTEMS ("Satellite IP Interactions")

CROSS-REFERENCE TO RELATED APPLICATIONS

This application claims the benefit of U.S. provisional patent application Ser. No. 61/572,332, filed on Jul. 14, 2011 (the "Provisional Applications"), which is hereby fully incorporated herein by reference.

TECHNICAL FIELD

The present application relates to broadcast and receiver technology, an in particular to the interaction of a receiver or other user device with both satellite and Internet protocol communications pathways to receive audio content and associated data, and thereby optimize a user's experience.

BACKGROUND OF THE INVENTION

Conventionally, broadcast audio content was delivered to users over radio, such as via AM and FM radio stations. More recently, digital radio has been delivered to users via satellite transmission, such as, for example, is the case with the Satellite Digital Audio Radio Service provided by Sirius XM Radio Inc., namely the Sirius and XM services. Even more recently, listeners have been able to access both streamed versions of broadcast radio stations, as well as web-only digital audio content providers via "Internet radio." Finally, various music streaming services, such as, for example, Pandora, MOG, Spotify, Radio, etc., have arisen, which deliver music and other content to users over the Internet. With the advent of iPhones, smartphones, iPADs and the like, mobile users can easily access these services in mobile environments. However, there is a catch—the high bandwidth of good audio content files, even when sent compressed, can be high. Thus, users incur significant charges on data plans when accessing audio content via IP protocol on portable devices, and interestingly, such monthly charges can far exceed a monthly subscription to a given satellite radio service.

Digital broadcast via satellite direct to users allows for optimization of the signal to that application, inasmuch as the broadcaster controls the satellites, the uplink, the framing and contents of the signal, and all other aspects. Satellite broadcasters have well-appointed systems and infrastructure in place that allows them to reach millions of customers in mobile environments with optimized use of bandwidth and very high quality of service. However, direct satellite transmission uses one-way communications. There is no means for a user of a satellite receiver to "talk back" via signaling data or otherwise, to the broadcast system and "request" a specific type or piece of content or data.

Content delivered via IP based communications networks inherently has a two-way aspect to it. A device connected to an IP network can, via browsers, applications, etc., communicate with any other connected device, including, for example, a music service provider. This allows a user of such services to signal, in near real time and in a time shifted manner, preference information, likes/dislikes, browsing or listening history, "stickiness" to, and frequency of, each channel that he or she has accessed on the service. This can be leveraged, if done correctly, into information that allows personalized playlists to be streamed to that user, in a manner that best satisfies his or her wants and expectations.

As can well be appreciated, each of direct broadcast via satellite, and IP delivery via the Internet or other IP based communications networks, has advantages and disadvantages. What has not been developed offered are devices, systems and methods to utilize and leverage the benefits of each communications pathway in one system or device.

What is thus needed in the art are systems, methods and devices to combine satellite and IP delivered content, to optimize the benefits of each communications pathway, and offer users/listeners a truly top quality experience.

SUMMARY OF THE INVENTION

Systems and methods for interaction of satellite and Internet protocol features in content delivery systems are presented. Using such systems and methods, the delivery of some content to the same product by Satellite delivery, other content by IP delivery, and still other content by both Satellite and IP delivery can enhance the utility of both the content and the product for an end user and can further optimize the costs and quality of service associated with delivering the content. A method of providing content and data to a combined satellite and IP network receiver is presented, including broadcasting via satellite content and data to the receiver, and sending via an IP based communications network content and data to the receiver, where the content and data provided over the Satellite broadcast enables capabilities of the receiver needed to consume content received by IP delivery, and the content and data provided via IP delivery enables capabilities of the receiver needed to consume content received from the satellite broadcast.

BRIEF DESCRIPTION OF THE DRAWINGS

The above and other aspects of the invention, its nature, and various features will become more apparent upon consideration of the following detailed description, taken in conjunction with the accompanying drawings, in which like reference characters may refer to like parts throughout, and in which:

FIG. 'I depicts an exemplary screen shot seen on a combination Satellite radio and Internet Protocol user device according to an exemplary embodiment of the present invention;

FIG. 6 presents Table 1 which defines exemplary connections available in various exemplary environments;

FIG. 7 presents Table 2, which depicts Initial Tuned Channel conditions for an exemplary hybrid connection according to an exemplary embodiment of the present invention;

FIG. 8 presents Table 3 which depicts Initial Tuned Channel conditions for an exemplary hybrid connection when powering on in a portable configuration according to an exemplary embodiment of the present invention; and FIG. 9 depicts Table 4 which depicts Initial Tuned Channel conditions for an exemplary hybrid connection when an exemplary product is removed form a dock according to an exemplary embodiment of the present invention.

DETAILED DESCRIPTION OF THE INVENTION

Figure 1:
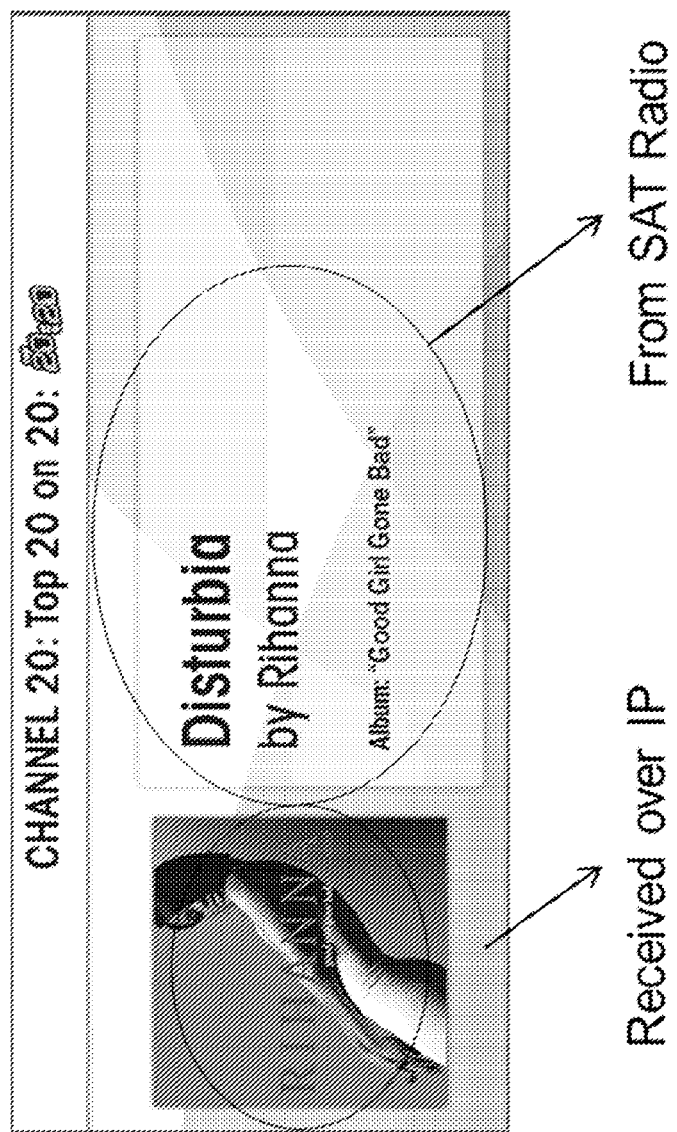

In exemplary embodiments of the present invention, a receiver or other user device arranged to receive a satellite behavioral requirements related to the interaction of Satellite ("Sat") and IP (i.e., over Wi-Fi) features for an exemplary implementation of a Product.

GLOSSARY OF KEY TERMS

The following is a glossary of terms and acronyms used herein, or related concepts, for ease of description of the various exemplary embodiments of the present invention. Some of the definitions relate, in particular, to certain exemplary embodiments of the invention based on the Sirius XM Radio Service, as implemented on a receiver or other user device arranged to receive the Sirius and/or XM service. It is understood that the specifics of such implementations are not limiting, and merely illustrative and exemplary. In addition, as used herein, a "Product" refers to a receiver, radio or user device that is arranged to receive a satellite signal, and that may also be arranged to receive, via Wi-Fi or otherwise, content and data via an Internet Protocol based communications network.

| | |
|---|---|
| Channel Master | A repository of channel associated metadata, used to source channel metadata to the EIPSC. |
| Content | The music, talk shows, sporting events, and other audio programs transmitted on an audio channel. |
| contentid | The primary unique identifier in the EIPSC for channels provided by the IP service. |
| EIPSC | Enterprise IP Service Center. A server for IP content and metadata. EIPSC aggregates channel and program metadata from multiple sources (including Channel Master, PDT, and EPG) and provides it to IP clients using a scalable server with access services designed for real-world product use cases. |
| EPG | Electronic Program Guide. A repository of metadata associated with "programs" broadcast on all channels. The EPG Core database maintains data for at least 14 days in the future, and sources fields provided by the EIPSC and also the broadcast (Sat) EPG data service. |
| Favorites | Synonym for presets. Whereas most OEM products use the term "preset", some aftermarket products (e.g., the exemplary implementation) use "Favorites" to refer to a preset. |
| Favorites Bank | A set of presets. A favorites bank may be a fixed number of presets, 5 for the exemplary implementation, 6 for many OEM vehicles, 10 for many aftermarket products, or a variable length scrollable list as provided by a number of portable aftermarket products. Most products support multiple favorites or preset banks. |
| Hybrid | Refers to simultaneous Sat and IP connectivity. |
| IP | Term used herein for "streaming content over the Internet", which may be delivered to a device by Wi-Fi, a cellular connection, or cable. Used primarily in contrast to "Sat", which refers to the satellite broadcast service. (Technically IP = "Internet Protocol") |
| Look Ahead | Metadata associated with an audio segment (song, track, etc.) that is provided a few seconds before the segment begins playing. Data such as Song ID, Artist ID, live sports teams, and traffic/weather city identifiers are provided as Look Ahead data for the Sat broadcast. |
| Look Around | Metadata that can be accessed by the receiver for any channel regardless of whether the receiver is tuned to (playing) the channel. All content metadata referenced in this document for both Sat and IP is Look Around. |
| Metadata | Data fields that describe the contents carried by a channel such as Song Title, Artist Name, Song Tag, SID, etc. |
| Normative | Information to be treated as formal testable requirements. (see also Informative) |
| NVM | Non-Volatile Memory such as Flash or EEPROM |
| PDT | Program Descriptive Text. Used to refer to metadata associated with played content, e.g., artist, title, and numerous other song/segment/program metadata. |
| platform | Refers to a reusable "software platform", exclusive of product-specific user interface functions and policy. |
| Preset | A channel assigned to a hard or soft button or a list element in a product UI that allows the user to quickly select that channel with a simple action. |
| Preset Bank | Synonym for "Favorites Bank" (see definition), more commonly used for OEM products. |
| radio | Refers to the entire product, not necessarily one subcomponent of the product. |
| RAM | Volatile memory (random access memory). Data in RAM is lost when the product is powered off. Term is often used in contrast to NVM. |
| SID | Service Identifier. A unique fixed number assigned to every broadcast service. The SID of a channel is treated as a constant, with the associated user-visible Channel Number treated as metadata for the channel, and subject to change. |
| synchronous metadata | Refers to metadata related to currently playing content that is time synchronized with the associated content. Synchronous metadata can include fields such as artist, title, Program ID, team IDs, etc. |

| | |
|---|---|
| | ("Asynchronous metadata" examples include channel names, EPG data for future programs, etc.) |
| UI | User Interface |
| User Preset, User Favorite | A preset for which a user has selected the assigned channel (as opposed to a Featured Favorite where service provider assigns a channel). |
| SatelliteSID | Provided by an EIPSC for an IP channel, if > 0 this value is the satellite SID of the same channel in the satellite broadcast lineup. |

Functional Requirements

1. Summary

The following describes systems and/or methods wherein the delivery of some content to the same Product by Satellite delivery, other content by IP delivery, and other content by both Satellite and IP delivery can enhance the utility of the content and Product for the end user and can further optimize the costs and quality of service associated with delivering the content.

The main contrast between Satellite delivery and IP delivery in this context is the broadcast, one-way, one-to-many signaling used for Satellite, and the two-way, one-to-one or multi-cast signaling used for IP. For Satellite delivery, the incremental system cost of delivery to each additional receiver (excluding the receiver cost itself) is essentially zero. For IP delivery featuring one-to-one or multi-cast connections to the receiver, there is a non-zero cost for each additional receiver. Satellite delivery is most cost effective for delivering content wherein all receivers need to receive the same content at the same time, whereas IP delivery can be more cost effective for delivering different content to each receiver or the same content to different receivers at different times. IP delivery also typically provides higher direct bandwidth to the receiver than Satellite delivery, allowing faster delivery of content to the receiver. Satellite delivery systems such as the Sirius XM Radio satellite delivery system are optimized for very high connection reliability for any receiver in the system's geographic service area, particularly to the automobile; whereas IP delivery systems are more likely to experience weakness in connection reliability in geographic areas remote from primary urban and suburban service areas or in high population density areas where useable bandwidth limitations may apply due to heavy consumer usage.

In a Product that supports reception of content using both Satellite delivery and IP delivery, data may be provided over the IP link to the product that enables Product capabilities associated with consuming content received by Satellite delivery. Similarly, data may be provided over the Satellite broadcast that enables Product capabilities associated with consuming content received by IP delivery. The selection of the delivery path to the product can be used to optimize the user experience and costs associated with providing Product system and end user features with significant improvements over conventional delivery of such content over only a Satellite delivery system or only an IP delivery system.

For example, in exemplary embodiments of the present invention, the following factors can be considered:

Speed of content delivery—For content where it is critical to deliver the content to the Product with immediacy (e.g. in response to some user action or request), IP delivery can be used. For content where a steady stream of data (e.g., an audio channel for Satellite Radio, or background updates to delivered data content) is required, Satellite delivery is effective.

Uniqueness of content—For content wherein different content must be delivered to each receiver or small groups of receivers (e.g., on-demand audio content), IP delivery is most effective. For content wherein the same content must be delivered to all receivers or a large group of receivers (e.g. a Satellite Radio broadcast audio channel), Satellite delivery is most economical.

Interactivity—When specific content is required to service a Product function (e.g., providing a specific on-demand audio program, displaying a particular album art image, reporting weather conditions for a specific locale), IP delivery is suitable due to its two-way link, allowing the product to economically request the specific content, then receive it. For non-interactive content delivery (e.g., Satellite Radio broadcast audio channels), Satellite delivery is typically more economical.

Incremental link costs—Content delivered using Satellite delivery enjoys zero incremental bandwidth cost for each additional receiver. IP delivery however typically involves extra bandwidth costs for each Product to which a link is established.

Link Quality of Service—Where link quality of service is critical (e.g. for a continuous audio program broadcast), a Satellite delivery system optimized for extremely high reliability across the entire geographic service footprint (such as the Sirius XM Radio broadcast system) provides an optimum user experience, minimizing content "drop-outs" due to link failures. In contrast, some geographic sub-areas within an overall service area may not support robust connections for IP delivery, or some high population density areas may experience link problems due to high usage demands, resulting in user-perceived content delivery drop-outs from link failures.

In general, with a system and Product that supports both Satellite delivery and IP delivery, a system operator can optimize the end user experience and operational costs by delivering broadcast content such as, for example, audio radio channels and background data updates using Satellite delivery; and interactive and on-demand content such as, for example, audio programs specifically requested by the user, or data required in response to a user interaction with the Product using IP delivery.

More specifically, content associated with an infotainment delivery system such as, for example, Sirius XM Radio can be delivered as described below:

Channel Lineup Information—Information describing the Satellite broadcast audio channel lineup, such as, for example, channel names, categories, descriptions, and the like, can, for example, be delivered over IP for rapid delivery of lineup change information to a Product. This information can, for example, include lineup information for content delivered (i) exclusively over Satellite, (ii) exclusively over IP, or (iii) over both Satellite and IP.

Channel Graphics—Graphics images and other visual components associated with the Satellite broadcast audio channel lineup may be delivered over IP for rapid delivery of lineup change information to the Product. This information may include graphics information for content delivered exclusively over Satellite, exclusively over IP, or delivered over both Satellite and IP.

Synchronized Still Images—Images such as Album Art, live studio images, or newsreel images synchronized with an audio program including but not limited to that described in Document of the Provisional Application, can, for example, be delivered over IP for timely provision to the Product user. This information may include graphics information for content delivered exclusively over Satellite, exclusively over IP, or delivered over both Satellite and IP. An example of this is illustrated in FIG. 1, where channel and then playing song information is received form the satellite broadcast, but Album Art, here the cover of Rhianna's "Golden Girl Gone Bad" album, was sent via an IP connection. Both streams of information are processed in an exemplary combined receiver, and thus presented seamlessly to a user.

Synchronized Content Information—Information such as artist biographies, supplementary artist images, lyrics, etc. synchronized with an audio program may be delivered over IP for timely provision to the Product user. This information may include information for content delivered exclusively over Satellite, exclusively over IP, or delivered over both Satellite and IP.

Featured Favorites—Definitions of convenient channel presets for the Satellite content, including but not limited to that described in Document [7] of the Provisional Application may be delivered over IP for timely provision to the Product user. This information may include presets information for content delivered exclusively over Satellite, exclusively over IP, or delivered over both Satellite and IP.

Program Guide—Program Guide information for the Satellite content, including but not limited to that described in Documents [2] and [9] of the Provisional Application, can, for example, be delivered over IP for timely provision to an exemplary Product user, particularly in response to user-Product interactions requesting specific program information, or personalized requests. This information can include, for example, program guide information for broadcast or streamed content delivered (i) exclusively over Satellite, (ii) exclusively over IP, or (iii) over both Satellite and IP.

On-Demand Content and Catalog—On-demand content (e.g. specific program content requested by a user) may be delivered over the IP link, allowing each Product user to efficiently enjoy content of their specific interest at a time convenient to them. In addition, on-demand content may be delivered over Satellite in the background to economically delivery popular or "showcase" content to multiple Products without incurring IP delivery costs for each user (see Document [8]). A catalog of available on-demand content may be delivered over IP for rapid access to up-to-date listings, and/or delivered over Satellite for economical delivery of baseline catalog information to multiple Products.

User Preferences—Personalized user preference including but not limited to any of channel presets, favorite sports teams, favorite weather report cities, favorite artists, preferred traffic report areas and routes, preferred fuel station reports, preferred news categories, locked channel specifications, hidden channel specifications, channel selections for Shadow Recording (see Document [6]) of the Provisional Application, Product UI behavior customizations (skins, UI layout, soft button assignments, voice recognition customizations, etc.), Show alerts (see Documents [2] and [9]) of the Provisional Application, personalized music selection parameters, may be delivered to the Product over IP. Such personalized information may be entered through a web page, from a user's cellphone, or via another IP-connected device for preparation and editing. Moreover, changes made to the personalized information while operating the Product may also be transmitted back to a central repository over the IP link supported by the Product. The User Preferences repository may also be provided to multiple Products owned by the user over an IP link, such that changes made to for one Product are properly reflected in other Product(s) owned by the user.

Audio Content—Broadcast audio content, wherein the same content is provided to a multitude of Products, can be delivered over Satellite very cost-effectively and with high quality of service. In addition, specialized channels of audio content can be delivered exclusively over IP to supplement the main Satellite channels, relieving the bandwidth burden on the Satellite broadcast for those channels of interest to only a small subset of service users. Also, all channels provided over the Satellite may also be duplicated with optional IP delivery for the enjoyment by users who are using an IP-only device (such as a cellphone) when not connected to a Product incorporating a Satellite receiver.

Promo Pass—A Promo Pass is a notification provided to the user when listening to audio content of some forthcoming program event, and the ability of the user through Product interaction to indicate they would like to hear that program when it is available. Promo Pass alert metadata may be transmitted via Satellite, synchronized with an audio announcement about the program, triggering an option in the Product user interface for the user to indicate their interest in the program (i.e., user "selects a Promo Pass"). Once a Promo Pass is selected, the Product may monitor for the availability of that program in the system on-demand repository, and when available, automatically download the program over the IP link to Product storage (or storage in a connected cellphone) so it can be listened to at the user's convenience. Alternatively, the available program may be streamed over IP directly from the system repository when requested by the user. Alternatively, a program selected by Promo Pass may be recorded from the Satellite or IP signal to Product memory at the time it is broadcast in the future, so the user can later listen to the content recording at their convenience. Promo Pass alert metadata may also be provided to the Product over the IP link, either synchronized with Satellite delivered audio content or IP streamed audio content.

Season Pass—A Season Pass is similar to Promo Pass described above, except that the user asserting interest in a Season Pass is effectively requesting that they wish to hear all future episodes of a program series.

Subscription Transactions—The Product two-way IP link may be used to initiate transactions to update Product service subscription status including but not limited to any of starting a subscription, renewing a subscription, converting a trial subscription to a paid subscription, changing the subscription tier. The IP and Satellite links may be used effectively together to maximize economics, for example the Satellite link used to message or notify large groups of users of subscription opportunities and/or download information used to trigger subscription-related notification events, and the IP link used for interactions by the user when acting on a subscription transaction.

Song Identification—Information for identifying a song currently playing on a channel may be delivered over IP for timely provision to the Product user. This information may include information for content delivered exclusively over Satellite, exclusively over IP, or delivered over both Satellite and IP.

Song Purchase—The Product two-way IP link may be used to initiate transactions to purchase a song identified by metadata provided over either Satellite or IP, including but not limited to any of simply flagging the song for later review and possible purchase, purchasing the song from a vendor such that it is retained in the user's vendor-sponsored repository for later listening, purchasing the song such that is downloaded to the Product for later on-demand listening, or purchasing the song such that is downloaded to a cellphone or digital music player linked to the Product The IP and Satellite links may be used effectively together to maximize economics, for example the Satellite link used to provide basic song metadata to all Products, and the IP link used for expanded song metadata access and song purchase transactions.

Showcase—The Showcase service delivers cached content primarily over the Satellite system, and is described more fully in the Provisional Application. The result of Showcase is a collection of content stored in Product memory, which has been received and processed in the background over some extended period of time (e.g. ranging from a few hours to a few weeks). Once the content has been completely received and is ready for play, the user can access the Showcase content and play it on-demand. Showcase delivery by Satellite can be supplemented by the IP link for the percentage of receivers that did not fully receive the Showcase content over the targeted Satellite delivery period. For example, if a user rarely had the Satellite radio on while Showcase was delivered and therefore did not yet receive the full content, an interaction over the IP link could request additional data (e.g. RFD blocks) to complete the full reception of the Showcase data. In this way the economical delivery of Showcase by Satellite is used for the great majority of content delivery, but the IP link adds assurance of complete delivery for the small percentage of Products that did not receive delivery. This approach of using Satellite plus IP for economical but assured delivery of bulk content can be applied to any type of content (i.e. not just Showcase), including software updates, database updates, and content downloading.

Voice Control and Support

Voice Management of Product Features

In exemplary embodiments of the present invention, a Product can, for example, incorporate an Automatic Speech Recognition (ASR) engine and/or Text To Speech (TTS) system to support user control of Product features and/or content reporting. The ASR and/or TTS components can, for example, be incorporated in a single integrated circuit, in multiple integrated circuits, or in separate physical modules linked by wired data links, including but not limited to, any of a vehicle bus, USB, serial data link, or synchronous data link or linked by wireless data links including but not limited to any of Bluetooth, ZigBee, UWB, Wi-Fi.

In another Product embodiment of a content delivery system, the ASR and/or TTS components can, for example, be provided by an externally linked device such as, for example, a cellphone, with an audio and/or data link from the cellphone to the Product provided over a wireless link, including but not limited to any of Bluetooth, ZigBee, UWB, Wi-Fi, or the link from the cellphone to the Product provided over a wired link including, but not limited to any of a vehicle bus, USB, serial data link, or synchronous data link, for example.

Delivery of Phonetics Data for Product Feature Voice Control

In exemplary embodiments of the present invention, phonetics data can, for example, be transmitted to a Product over either the Satellite or the IP link or both. The Phonetics data may be used by the Product's Automatic Speech Recognition (ASR) engine and/or Text To Speech (TTS) system to properly recognize the terminology associated with Product features, content, and control. For example, the Phonetics data may include specifications for proper pronunciation of all the channel names offered by the service. Such Phonetics data can be provided in vendor-independent format, such as, for example, SAMPA, or in vendor-specific format such as, for example, from a vendor such as Nuance.

In exemplary embodiments of the present invention the Phonetics data can also include, for example, grammars and data structures that convey speech-directed operation of any of the Product features, content, and control.

Product Architecture

Content Delivery Link

In one exemplary embodiment of a content delivery system, a Product incorporates both a Satellite receiver and an IP receiver. The two receivers can be incorporated in a single integrated circuit, in multiple integrated circuits, or in separate physical modules linked by wired data links including but not limited to any of a vehicle bus, USB, serial data link, or synchronous data link or linked by wireless data links including but not limited to any of Bluetooth, ZigBee, UWB, Wi-Fi.

In another exemplary embodiment of a content delivery system, the Product incorporates both a Satellite receiver with an IP delivery link to the Product provided through a cellphone, with the link from the cellphone to the Product provided over a wireless link including but not limited to any of Bluetooth, ZigBee, UWB, Wi-Fi, or the link from the cellphone to the Product provided over a wired link including but not limited to any of a vehicle bus, USB, serial data link, or synchronous data link.

In an alternative embodiment of a content delivery system, a Product end user can, for example, also use a personal device, such as a cellphone or other device capable of IP reception, to enjoy content delivery over IP when the personal device is not linked to the Product. For example, a user may enjoy content delivered to the cellphone when not in a car that contains the Product incorporating the Satellite receiver.

Content Storage

In exemplary embodiments of the present invention, content delivered to a Product can, for example, be stored in either volatile storage (e.g., RAM or similar) or non-volatile storage (e.g., FLASH or hard drive or similar), wherein the storage component can be integrated in the Product chipsets, in a product module, or, for example, provided in a separate physical module linked by wired data links, including but not limited to, any of a vehicle bus, USB, serial data link, or synchronous data link, or linked by wireless data links, including but not limited to, any of Bluetooth, ZigBee, UWB, Wi-Fi. It is noted that in Product architectures incorporating a cellphone, some or all delivered or processed content may also be stored in memory incorporated in the cellphone.

In the following description, a product is said to be in "Sat Mode" when listening to satellite-sourced content, and in "IP Mode" when listening to IP-sourced content. This "Source Mode" refers to Sat Mode, IP Mode, or Offline Mode (i.e., listening to previously recorded content). For ease of discussion, these terms will often be abbreviated as simply "Sat" and "IP."

In exemplary embodiments of the present invention, a Sat/IP receiver can, for example, have the following functionalities: (i) Favorites (presets) set from IP and Sat modes can be mixed in one bank; (ii) selecting a preset originally set in either mode will attempt to tune it in the current mode; (iii) avoid missing an EPG-based Alert set in Sat mode if it occurs while in IP mode; and vice versa; (iv) Custom Filters (based on categories) set and edited in either mode will be used in the other mode; (v) initial selection of Sat vs. IP play when inserting a receiver in a dock is automated and based on the type of dock, last play mode, etc.

Further, in some exemplary embodiments, a receiver can comply with some or all of the following restrictions: (i) not connect and receive content simultaneously from both Sat and IP; (ii) not automatically change from active Sat Mode to active IP Mode based on user selection of a channel or response to an Alert; (iii) when tuning channels (Spectrum, etc.) only channels available in the current mode are shown; (iv) when using an EPG, only EPG data from one mode (Sat or IP) is accessible (though the user can toggle between either dataset); (v) alerts based on the EPG can be set in either IP or Sat mode, and can be triggered regardless of the listening mode (Sat, IP, or Offline); (vi) alerts based on synchronous Sat metadata (e.g. for Game Alert/Zone, Traffic Jump) will trigger only in Sat mode.

2. Background

Figure 2:
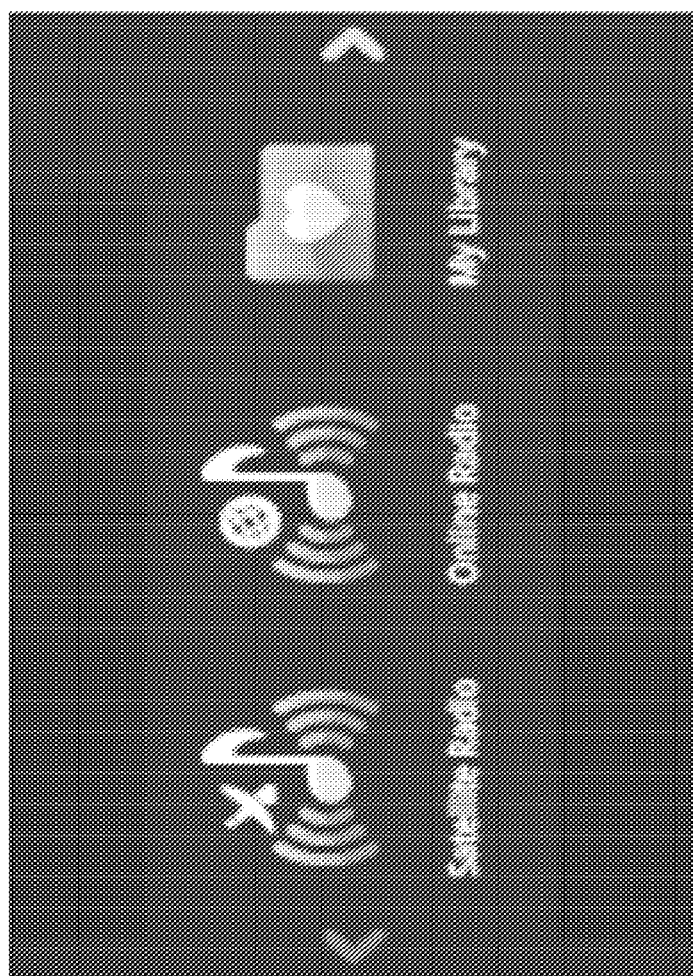
FIG. 2 depicts an exemplary home screen by which a user can change between Satellite and IP modes on a combination Satellite radio and Internet Protocol user device according to an exemplary embodiment of the present invention.
Figure 3:
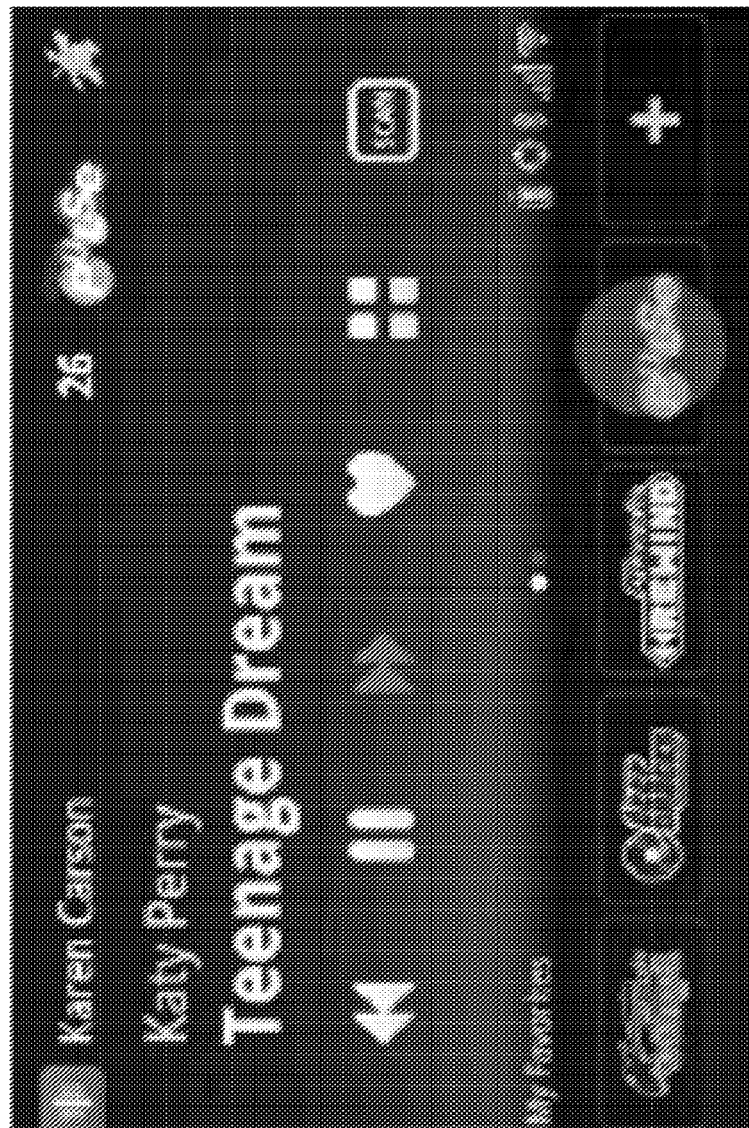
FIG. 3 depicts an exemplary screen showing both Satellite and IP User Favorites on a combination device according to an exemplary embodiment of the present invention.
Figures 4A, 4B:
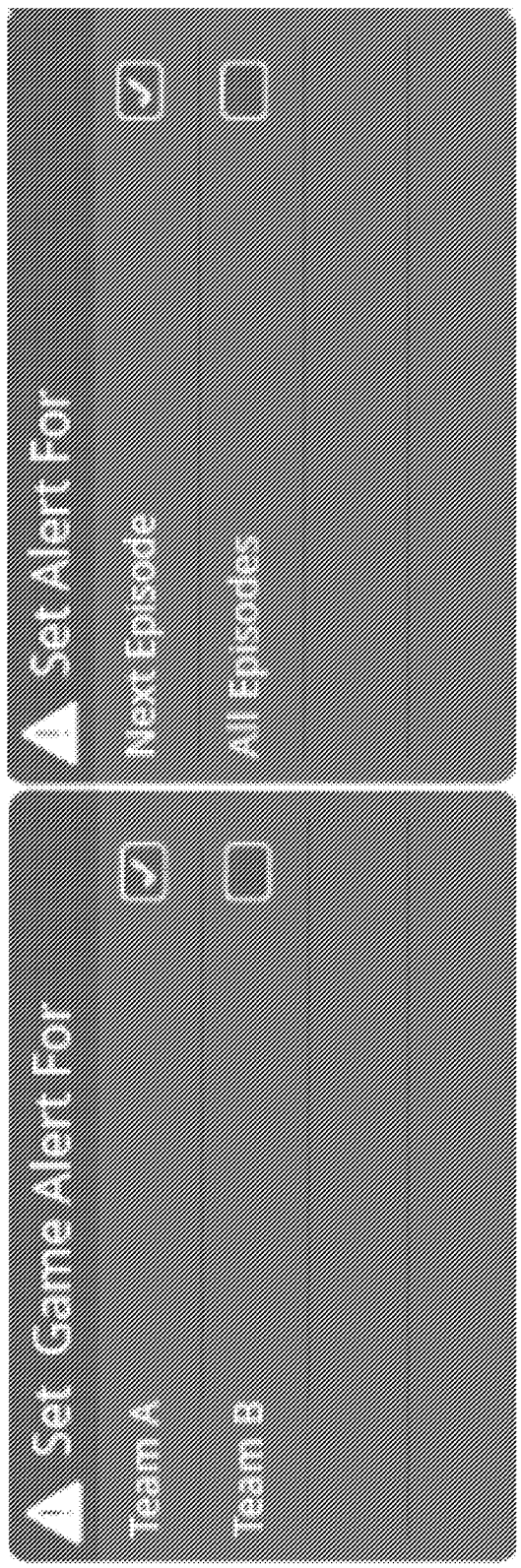
FIGS. 4A and 4B depict illustrative user interfaces for setting a Game Alert and a (standard) Alert on a combination device according to an exemplary embodiment of the present invention.
Figure 5:
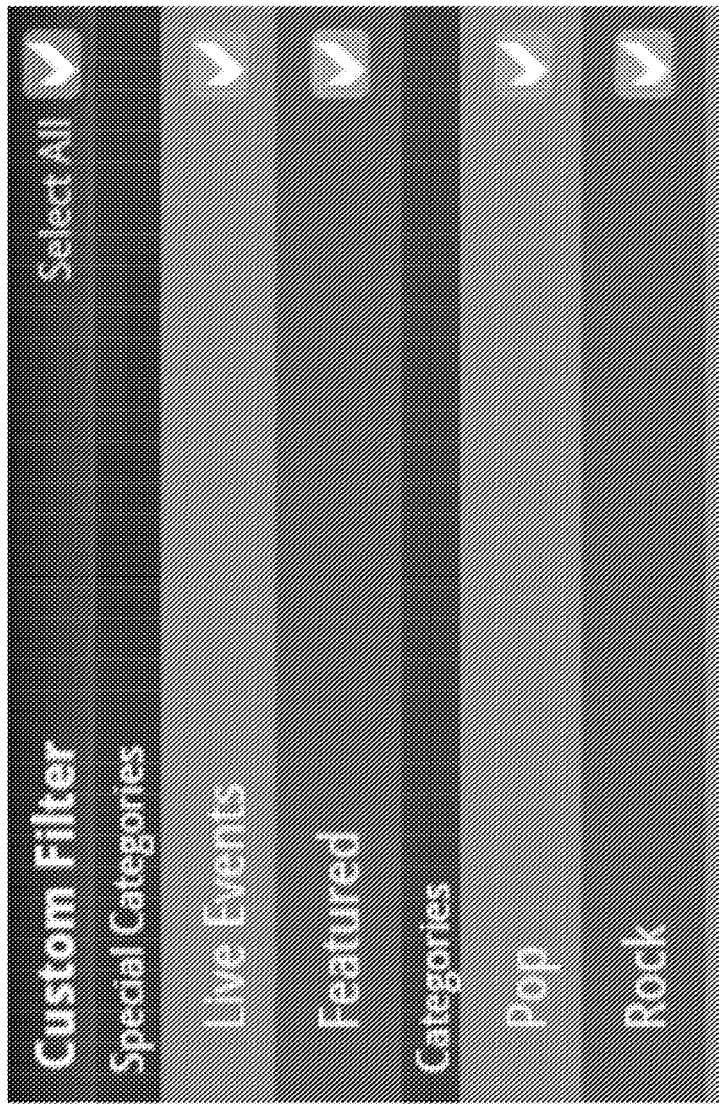
FIG. 5 depicts an exemplary screen shot for defining a custom filter in accordance with various exemplary embodiments of the present invention.

In exemplary embodiments of the present invention, a home screen (accessed, for example, by a dedicated Home Button, or invoked under certain conditions of connection failure) can be provided to allow the user to change between Sat and IP Modes, as shown, for example, in FIG. 2:

When in either Sat or IP Mode, an exemplary radio can provide direct user access to live content from only the Sat or IP source, respectively. In such embodiments, the following behaviors can, for example, be observed, where the term "Active Source" refers to either Sat or IP, depending on the then current Source Mode.

- Spectrum—only channels in the current Source Mode are exposed when tuning using the Spectrum and all subordinate filtering functions.
- Show Finder (EPG)—channels and programs from either the Sat or IP EPG data, but not both simultaneously, can be accessed, whether the product is connected or not.
- Special Categories—includes only channels in the current Source Mode.
- Settings—settings functions that require access to a current channel lineup (e.g., locking and hiding specific channels) are not supported unless the product is in either Sat or IP Mode, and the channels for the current Source Mode are used for the lineup information.

There are three exceptions to the modal separation of Sat and IP channels in such exemplary embodiments, as follows:

- User Favorites—a User Favorite bank can include a mixture of Sat and IP channels, any of which may be available on both Sat and IP, only on Sat, or only on IP. The main motivation for such a User Favorites exception is to avoid the awkwardness of having to establish separate "IP only" or "Sat only" User Favorite banks, particularly since many channels can, for example, be readily available on both Sat and IP.
- Alerts—show Alerts can be presented to a user regardless of which Mode the user was in when the Alert was originally requested by the user, or whether the channel referenced by the Alert is available on both Sat and IP, only on Sat, or only on IP. Game Alerts, it is noted, can be presented to a user only when receiving Sat.

It is here noted that a motivation for the Alerts exception is to avoid the user completely missing a previously set Show Alert, just because they are operating the product in a different mode than when the Show Alert was previously requested. In many cases, an Alert for a show that was armed in one mode can be heard on an equivalent channel in the other mode anyway; and if not, the user should still get the benefit of the Alert to make their own decision whether to put the device in a different mode.
- Custom Filters—in exemplary embodiments of the present invention, a custom filter, comprising a user's selections of Categories and Special Categories (as those terms and associated functionalities are described in the Provisional Application), can, for example, be included when showing channels in the Spectrum and other filtered channel lists, and can, for example, be shared between IP and Sat Modes. In exemplary embodiments of the present invention, if a user adds/removes a Category or Special Category in Sat Mode, the same change can thus be reflected when next operating in IP Mode, and vice versa.

3. Key Concepts

3.1 Connections and Source Modes

In exemplary embodiments of the present invention, an exemplary product can operate with one of the following Connections: (i) Sat-Only Connection—the product is receiving the satellite broadcast; (ii) IP-Only Connection—the product is connected to the EIPSC (Wi-Fi and IP network is available); and (iii) No Connection—The product is receiving neither the satellite broadcast nor is it connected to an EIPSC. It is here noted that a product that is in Wi-Fi signal but not connected to an EIPSC is not considered to have an IP Connection, for purposes of this disclosure.

In exemplary embodiments of the present invention, a product can be operating in one of the following Source Modes: (i) Sat Mode—the product is playing content from the broadcast satellite signal; (ii) IP Mode—the product is playing content from the IP service; and (iii) Offline Mode—the product is playing stored content (e.g., My Channel, Radio Replays, MP3s, etc.)

It is noted that the Source Mode is somewhat independent of the Connection. Thus, for example, a product can operate with a Sat-Only Connection, but can be used in either Sat Mode or Offline Mode. Of course, a product cannot be in Sat Mode with an IP-Only Connection, or vice versa.

3.2 Channel Sources

In exemplary embodiments of the present invention, a given channel can inherently have one of the following Source types: (i) Sat-only channel—channel is available only from the Satellite broadcast; (ii) IP-only channel—

Channel is available only from the IP service; and (iii) Sat+IP channel—Channel is available from either the Satellite broadcast or IP service.

In exemplary embodiments of the present invention, a Sat-only channel can be a channel for which the channel is provided in the Sat broadcast service lineup, and therefore assigned a broadcast Channel Number and Broadcast SID, and does not have an equivalent channel in the IP service, by virtue of no channel in the EIPSC Channel Lineup having a reference to the Sat channel's Broadcast SID.

Similarly, an IP-only channel can, for example, be a channel provided by an EIPSC streaming service, and therefore assigned a unique contentID (an exemplary primary channel identifier for the IP service) and ChannelNo (an exemplary user visible IP channel number) in an EIPSC Channel Lineup Service. Such an IP-only channel would not have an equivalent channel in the Sat service, by virtue there being no reference to a Sat channel Broadcast SID in an EIPSC Channel Lineup Service for that IP channel.

In exemplary embodiments of the present invention, a Sat+IP channel can, for example, be a channel that is (i) provided in the Sat broadcast service lineup, and therefore assigned a broadcast Channel Number and Broadcast SID, and (ii) also provided by the EIPSC streaming service, and therefore assigned a contentID (the primary IP channel identifier) and ChannelNo (the user visible IP channel number) unique to the IP service. Thus, a channel entry in an EIPSC Channel Lineup for that IP channel can reference a Broadcast SID.

In exemplary embodiments of the present invention, a Sat+IP channel can, for example be effectively Sat-only or IP-only for a specific receiver if it is unavailable as part of the authorized subscription for that receiver on either Sat or IP. Additionally, a Sat+IP channel can, for example, be temporarily treated as Sat-only or IP-only for Show Alert notification purposes if a Program currently aired on the IP channel is different from the Program currently aired on the Sat channel.

3.2.1. Detecting Sat+IP Channels

In exemplary embodiments of the present invention, a receiver can determine if a known Sat channel is currently available on IP only when it can (a) connect to IP and query the EIPSC for a channel with field SatelfiteSID equal to the Sat channel's Broadcast SID and (b) verify that the channel is available in the user's IP subscription.

In exemplary embodiment of the present invention, the receiver can, for example, determine if a known IP channel is currently available on Sat by determining that (a) the EIPSC metadata field SatelliteSID is present, non-blank, and greater than zero for the channel; and (b) that this value matches a satellite Broadcast SID of a channel authorized for the receiver.

3.2.2 Storing Sat+IP Channel Metadata

In exemplary embodiments of the present invention, the product can, for example, maintain an NVM cache for all IP channels based on the latest IP lineup information obtained during the most recent IP connection, including, for example, the following for each channel: contentID and SatelliteSID.

This information is required to support resolution of Sat/IP channel equivalency for features such as Favorites, EPG-based Alerts, channel Locking/Hiding, and tuning to the last channel on dock transitions.

In exemplary embodiments of the present invention, favorites for channels, the last tuned channel for Sat, and the last tuned channel for IP, the following metadata can be stored by a Host application to support determination of whether a channel is available on both Sat and IP, and to support display of basic channel information in situations where the channel is not available in the current Source Mode. Furthermore, for Channels selected as Favorites, the following information can preferably be stored. Channel Logo, as provided when the product was most recently used in the Source Mode in which the channel was originally assigned as a Favorite. It is noted that the Channel Logo is required for Favorites so that a logo can be shown in the Favorites bank when the channel is not available in the current Source Mode (and thus shown as grayed out). It is noted that if a Favorite channel is available in the current mode, the Channel Logo provided for that channel in the current Source Mode can always displayed, regardless of the logo stored with the Favorites channel metadata by the Host.

3.2.3 Detecting Sat+IP Categories

In exemplary embodiments of the present invention, a receiver can preferably determine if a known Sat Category is currently defined for IP only when it can connect to IP and query the EIPSC to search for a "Genre" with field SatelliteCatID, which is, for example, equal to a number from 1 to 63 corresponding to a defined Sat Category ID. In exemplary embodiment of the present invention, a given Category may be defined only for Sat, only for IP, or for both.

In exemplary embodiments of the present invention, a receiver can preferably determine if a known IP Category is currently defined for Sat when it can determine that (a) the EIPSC metadata field SatelliteCatID is present and within the range 1 to 63; and (b) that this value matches a satellite Category ID defined by the satellite broadcast lineup.

3.2.4 Storing IP Category Metadata

In exemplary embodiments of the present invention, a product can preferably maintain an NVM cache for all IP Categories based on the latest IP lineup information obtained during the most recent IP connection, including the following for each channel: genre key and SatelliteCatID. This information is required to support resolution of Sat/IP Category equivalency to support portability of "Custom Filters" between Sat and IP Modes.

3.3 Available Connections

Table 1, shown in FIG. 6 defines the connections available in an exemplary embodiment of the present invention for various operating environments. In other exemplary embodiments, the Portable environment can also support a Sat connection if a user connects an optional Travel Kit accessory, which incorporates a satellite antenna.

3.3.1 Offline Mode and Sat Connections

In exemplary embodiments of the present invention, in all environments, Offline Mode can, for example, also be supported. When some exemplary embodiments are used in the Portable environment (i.e., not connected to any dock) the Sat tuner subsystem can be powered off to preserve power. Further, the receiver chip processor can be powered if the user is playing content previously recorded from the Sat broadcast in Offline Mode; otherwise it too can be powered off. However, when the product is in any of the car, home, or boombox docks, the Sat tuner subsystem would not be powered off. In these environments, if the receiver is used in Offline Mode (e.g., playing recorded content) and a Sat signal is available, the product can, for example, preferably maintain a Sat Connection. This allows the product to continue background recording and also monitor for Alerts while the user is listening to Offline content.

3.4 Source Timing Offset Considerations (Informative)

In exemplary embodiments of the present invention, live content from an IP source can often necessarily be several minutes behind the same live content from a parallel Sat source. Thus, in exemplary embodiments of the present invention, such IP source delay can, for example, be due to the nature of buffering and playing encoded content, such as for example, chunked AAC+, where in that codec each chunk is 20 seconds of content. The encoder thus maintains a buffer of 5 chunks (so an offset of 5+1 chunks=2:00 minutes), and additional chunk buffering is generally performed in the receiver to tolerate brief outages (such as, for example, 8 chunks which equals 2:40 minutes, though buffer requirements may be reduced), so a total IP delay can be a minimum of 2 minutes and max of 4:40 minutes versus "wall clock time".

In exemplary embodiments of the present invention, when transitioning between live content on Sat versus IP for the same channel, a user can thus necessarily hear a few minutes of repeated content when going from Sat to IP, and miss a few minutes of content when going from IP to Sat. The time difference between Sat and IP also introduces some complexities due to the differences in synchronous metadata timing. For example, a Sat channel may begin broadcasting content different from its corresponding IP channel at, for example, 3 pm, such as, for example, a sports game for which there are only Sat broadcast rights. However, the IP channel content (and therefore a satIpDiffer flag from the EIPSC) may not change until 3:04.

4. Initial Channel Tuning 4.1 Car Dock, Home Dock, and Boombox

In exemplary embodiments of the present invention, when a product is started or docked while operating in a dock supporting both Sat and IP Connections (such as, for example, car dock, home dock, and boombox), an initially tuned channel and Source Mode depends on: (i) what connections are actually available, (ii) the last tuned channel (or Offline content source), (iii) what Source Mode the radio was last in when the last tuned channel was playing, and (iv) whether that channel is available on both Sat and IP. Thus, the product's dock sense, antenna detection, and Wi-Fi detection resources can be used, for example, to determine which connections can be used, for example, actually available.

Table 2, provided in FIG. 7, indicates which cannel is initially tuned as a function of the factors. In Table 2, the term "same channel" refers to the channel that was last playing before the unit was either powered off or inserted in a dock. It is noted that for the two items marked with ($^{Note'}$) in Table 2, the radio attempts to tune to the channel that was last played in IP [Sat] Mode, which will necessarily not be the same channel the user last heard, since the radio was previously tuned to a Sat [IP] channel that is not available on IP [Sat]. Thus, in exemplary embodiment of the present invention, a radio can preferably always save the last channel that was tuned on each of IP and Sat.

In exemplary embodiments of the present invention, a user was playing offline content at the time the product was docked, the offline content can continue playing after the product is docked, regardless of the available Sat and IP connections. However, if the product was not playing any content when docked (e.g., it was inserted in a dock while it was off), then its behavior can be determined by all of the preceding rows of the table, i.e., attempting to tune to a Sat or IP channel even if the last content played when the unit was turned off was offline content.

It is noted that whether the Sat and IP channels are playing the same content is not a factor in the policies described above for initial channel tuning. Further, for all cases, if for some reason the radio cannot tune to a selected channel because it has become unavailable, the radio can tune to Channel 1 (Preview) for Sat or Channel 2 (SiriusXM Hits 1) for IP.

4.2 Portable

Power-On in Portable Use

In exemplary embodiments of the present invention, when a product is powered on in a portable environment (which, in some exemplary embodiments may support IP connections only), an initially tuned channel can, for example, depend on: (i) the last tuned channel, (ii) what Source Mode the radio was last in when the channel was tuned, and (iii) whether that channel is available on both Sat and IP. It is noted that in exemplary embodiments where, for example, a Travel Kit Accessory is supported (which provides an antenna so as to receive a Satellite broadcast), a Portable environment can also support a Sat connection. In this case, powering on in Portable Use will operate as described above in connection with Table 2.

Powered-On Dock Removal

In exemplary embodiments of the present invention, when a product is removed from a dock while powered on (i.e., transitioning to Portable use while already operating), the initially tuned channel can, for example, depend on: (i) the tuned channel or Offline content playing when the product was removed from the dock, (ii) what Source Mode the radio was last in when the product was removed from the dock, and (iii) whether that current channel is available on both Sat and IP.

Manual Mode Change

In exemplary embodiments of the present invention, when a user manually changes Source Modes (e.g., from the Home Screen—FIG. 2), the initial channel selection can be either: (i) the last channel tuned in the exited Source Mode if that channel is a Sat+IP channel (i.e., also available in the new selected Source Mode), else (ii) the last channel tuned when previously tuned to the new selected Source Mode, else (iii) Channel 1 (Preview) for Sat, or Channel 2 (SiriusXM Hits 1) for IP. In such exemplary embodiments, this policy can provide a seamless transition between Sat and IP for a user listening to a Sat+IP channel, with a reasonable and intuitive alternative when listening to either a Sat-only or IP-only channel before the mode change.

5. Spectrum Tuning

In exemplary embodiments of the present invention, when a receiver is in Sat Mode, only channels available in the satellite broadcast can be presented in the Spectrum displays. When in IP Mode, only channels available in the IP service can be presented in the Spectrum displays. Finally, in both Modes, My Channel (if authorized for the receiver) can be included in the Spectrum.

6. Favorites

Assigning a User Favorite Channel

In exemplary embodiments of the present invention, a user can be able to assign a channel from the current Source Mode to a slot in any User Favorite bank, regardless of whether they are in IP Mode or Sat Mode. The result can be a mixture of Sat-only, IP-only, and Sat+IP channels within the same User Favorite bank. When a channel is assigned to a User Favorites bank, the metadata (identifiers, logos, etc.) associated with the channel in the current Source Mode can be stored with the channel, and it can, for example, be designated as a default Sat Mode or IP Mode channel ("Default Source Mode"), corresponding to the current Source Mode at the time the assignment is made.

At channel assignment time, the receiver does not determine if the channel is Sat+IP. Thus, the receiver must store sufficient information about the channel to allow it to later determine if it is a Sat+IP channel if and when connected to the opposite source (e.g., the broadcast SID for Sat, and contentiD and SatelliteSID for IP) as described in Section 3 above.

In exemplary embodiments of the present invention, the Default Source Mode of a channel is essentially for internal software housekeeping only, and not this need not be explicitly indicated to the end user.

In exemplary embodiments of the present invention, My Channel (if authorized for the receiver) can also be assigned as a Favorite channel.

Selecting a User Favorite Channel

When a user selects a preset channel from a User Favorite bank:
- (A) If that preset's Default Source Mode matches the current Source Mode, the channel can be immediately tuned (normal behavior).
- (B) If that preset's Default Source Mode does not match the current Source Mode, then the receiver determines if the same channel is also available in the current Source Mode (i.e., if it is a Sat+IP channel), using the methods and stored metadata described above in Section 5. Then (1) if the channel is available in the current Source Mode, it is immediately tuned. However (2), if the channel is not available in the current Source Mode, then the receiver can display a message informing the user that the channel is not available, and they must change to the other Mode to tune to the channel. In this case, the channel and Mode tuned before the preset selection attempt remains tuned.

It is noted that in such exemplary embodiments, whether the Sat and IP channels are playing the same content is not a factor in the policy used for favorite channel selection.

Featured Favorites

In exemplary embodiments of the present invention, a user can access Featured Favorites banks regardless of Source Mode. This is consistent with the approach that any User Favorites banks can contain either Sat or IP channels. If a user selects a channel from a Featured Favorite bank while in IP Mode, the behavior is the same as described above for selecting a Sat channel from a User Favorite bank while in IP Mode. In effect, in such exemplary embodiments, Featured Favorites presets can be treated by the product software as if they are "Default Source Mode=Sat".

7. Alerts

In exemplary embodiment of the present invention, two types of alerts are considered for behaviors in the context of Sat and IP operation. These are as follows:
- (A) Seek-based Alerts—these alerts are based on detection of synchronous Look Around and/or Look Ahead metadata identifying content of interest to the user. In such embodiments, Game Alerts can be treated, for example, Seek-based Alerts. Metadata synchronized with the corresponding audio program on the Sat broadcast can be used by the receiver to detect a program of interest and generate the alert. In alternate exemplary embodiments, these alerts can also be supported for IP channels.
- (B) EPG-based Alerts—these alerts are based on the user's selection of a Program from the EPG data and generate Show Alerts based on the published start time of a given Program in the EPG data.

7.1 Seek-Based Alerts

When establishing a Seek-based alert, a receiver can, for example, store metadata that can be matched to metadata received over Sat to trigger an Alert. The stored metadata can, for example, come from current segment metadata if the Alert is armed while listening to content (e.g. while listening to a game between two teams), or from metadata obtained from a database (such as, for example, team/league IDs) perused while the user is in a setup menu.

In exemplary embodiments of the present invention, Seek-based Alerts can be supported only when the product is receiving the Sat broadcast. If a Seek-based Alert is generated while the radio is connected to Sat, and if the user accepts the option to jump to the alerting channel, then the radio can simply tune to that Sat channel. In alternate exemplary embodiments, Seek-based Alerts can also be supported for IP mode.

In exemplary embodiments of the present invention, if a user is listening to Offline content while a Sat Connection is active, Seek-based Alerts can be supported.

7.2 EPG-Based Alerts

In exemplary embodiments of the present invention, separate caches of EPG data from both Sat and IP can be retained, such that this data can be accessed even during No Connection mode for purposes of a Show Finder function. It is noted that a "Show Finder" feature provides a user with access to information about shows on all channels over a period of up to 7 days in the future. Show Finder is a manifestation of EPG data to a user. While connected to Sat, broadcast Sat EPG data can be used for Show Finder functions. While connected to IP, IP EPG data (from an EIPSC) data can be used for Show Finder functions. In some exemplary embodiments, Sat and IP EPG data need not be integrated into a single local database, but in preferred exemplary embodiments it can be. Either way, a Show Finder user experience (which program data is available, navigation of the data, UI screens and flow, etc.) can be equivalent in both Sat and IP modes. Further details of Show Finder are provided in the Provisional Application, as well as in a co-filed application entitled "Systems and Methods for Providing an Interactive Electronic Program Guide and User Interactions Therewith".

Show Finder User Access

In exemplary embodiments of the present invention, the Show Finder can, for example, be accessible in all modes (Sat, IP, and Offline) and connections (Sat, IP, and No Connection). By default, when starting Show Finder in IP or Sat Mode, Show Finder can, for example, show content from the current Source Mode. However, in exemplary embodiments of the present invention, the user can also toggle Show Finder to display cached EPG data from either IP or Sat, regardless of the current Mode or Connection.

A user can, for example, set an Alert from Show Finder regardless of whether they are view IP. Sat data, and regardless of the current Mode or Connection of the Receiver.

When viewing Show Finder, access to EPG data is necessarily limited to that data that has been received and cached in NVM by the product. For both Sat and IP this scope of the cached data has a maximum, such as, for example, 7 days forward including the current day. Thus, after n days without connection to Sat, the extent of Sat program data available to the user in the Show Finder would, in such exemplary embodiments, be limited to 7-n days, until n>7, at which time an advisory can, for example, be generated to inform the user that no EPG data is available. The same policy can apply (independently) to IP program data availability, for example.

7.3 EPG-Based Alert Stored Data

In exemplary embodiments of the present invention, in order to support EPG-based Alerts that are armed while using IP EPG data (i.e., the alerts are set using Show Finder while perusing the IP EPG), it is necessary that the receiver augment EPG data with a SatelliteSID for each IP channel referenced in the cached IP EPG data. This allows the product to store a SatelliteSID for an Alert that is armed while not connected to IP, but when using Show Finder with the cached IP EPG data.

As used below, the term IP-sourced EPG Alert is an Alert that is established by a user when using IP EPG data. Similarly, a Sat-sourced EPG Alert is an Alert established by the user when using Sat EPG data. When establishing an EPG-based alert, a receiver can, for example, store the following information about the Alert: (i) Program Start Date; (ii) Program Start Time; (iii) Program ID; (iv) Channel Number (as identified when the Alert was armed); and (v) Alert Arming Source: Sat or IP, indicating which EPG source was used when the Alert was originally armed.

Additionally, for IP-Sourced Alerts: contentiD and xmSatelliteSID can also be stored; and For Sat-Sourced Alerts: the SIG can be stored. In exemplary embodiments of the present invention, other information, such as, for example, program title text, episode/repeat information, channel name, etc. can also be saved with Alerts.

7.3 EPG-Based Alert Triggers

Background

It is understood that in certain circumstances, an IP and Sat channel that usually play the same content can temporarily play different content. Thus, in exemplary embodiments of the present invention, it is beneficial to verify that a Program alert originally armed from an IP EPG is really what is playing on the Sat side if the user is in Sat Mode when it is triggered, and vice versa.

Policy

To address the concern noted above, in exemplary embodiments of the present invention, EPG-based Alert triggering can, for example, start with arrival of a current time/date that matches the Program Start Time and Date for a previously armed Alert. Logic on the device can, for example, then proceed as follows:

(1) If the current Source Mode is Sat
  (a) If the Alert Arming Source=Sat
    If the Alert SID matches an available channel, and the Alert Program ID matches a Program ID from the current broadcast EPG for the target channel playing at any time from the nominal Alert Start Time to 29 minutes after the nominal Alert Start Time; or there is no EPG data available for the time slot,
  then the Alert is presented to the user with an option to jump to the channel.
  Otherwise, the Alert is discarded.
  (b) If the Alert Arming Source=IP
    If the Alert SatelliteSiD matches the SID of an available channel, and the Alert Program ID matches a Program ID from the current broadcast EPG for the target channel playing at any time from the nominal Alert Start Time to 29 minutes after the nominal Alert Start Time[3]; or there is no EPG data available for the time slot, then
    the Alert is presented to the user with an option to jump to the channel. Otherwise, an informative Alert is presented to the user indicating they need to change to IP Mode to listen to the alerted program.

(2) If the current Source Mode is IP
  If the Alert Arming Source=IP
  If the Alert contentiD matches an available channel, and the Alert Program ID matches a Program ID from the current broadcast EPG for the target channel playing at any time from the nominal Alert Start Time to 29 minutes after the nominal Alert Start Time[3]; or there is no EPG data available for the time slot, then
    the Alert is presented to the user with an option to jump to the channel.
  Otherwise, the Alert is discarded.
  If the Alert Arming Source=Sat
  If the Alert SID matches xmSatelliteSID for a channel in the IP Channel Lineup, and
  the Alert Program ID matches a Program ID from the current broadcast EPG for the target channel playing at any time from the nominal Alert Start Time to 29 minutes after the nominal Alert Start Time[3]; or there is no EPG data available for the time slot, then
    the Alert is presented to the user with an option to jump to the channel.
  Otherwise, an informative Alert is presented to the user indicating they need to change to Sat Mode to listen to the alerted program.

(3) If the current Source Mode is Offline
  An informative Alert is presented to the user indicating the Program is starting on the channel identified by the Channel Number stored with the Alert.

It is noted that in (2) above, in connection with the "nominal Alert Start Time", the start time and duration of the matching Program in the EPG does not matter; this check simply assures that the target program is playing at some time during the ½ hour after the nominal Alert time, per the EPG, to avoid a false alert due to a change in program scheduling since the alert was set, or (in the cases where Alert Arming Source 0 current Source Mode) Sat and IP may not be broadcasting the same content.

In the descriptions above, an "informative Alert" is understood to refer to a visual prompt that provides information to a user, but neither provides an option for the user to change Source Modes nor to jump to a different channel.

8. Custom Filters

In exemplary embodiments of the present invention, if a user establishes a Custom Filter (by, for example, selecting specific Categories and Special Categories) in Sat Mode, the same Custom Filter can apply later when the user is in IP Mode, and vice versa.

It is noted that some Categories can, for example, be defined in Sat, but not in IP, and vice versa. Therefore, to address that issue, the following policies can, for example, be applied in various exemplary embodiments of the present invention:

(a) If a Category is defined in both Sat and IP, the latest include/exclude setting for that Category shall apply to both Sat and IP Mode operation; If a Category is defined in only Sat, the include/exclude setting for that Category shall apply to Sat Mode but be ignored in IP Mode. An entry for the Sat-only Category shall not appear in the Custom Filter menu for IP Mode;

(b) If a Category is defined in only IP, the include/exclude setting for that Category shall apply to IP Mode but be ignored in Sat Mode. An entry for the IP-only Category shall not appear in the Custom Filter menu for Sat Mode; and (c) When in a given Source Mode, the specific channels included or excluded for Sat+IP Category shall be based on the current channel lineup for that Source Mode.

The Special Categories "Live Events" and "Featured Events", if included in Custom Filters, can include channels designated as Live or Featured through data provided by the EPG for the current Source Mode.

9. Channel Locks and Hiding

In exemplary embodiments of the present invention, the ability to Lock and/or Hide channels through the Settings screens can be provided. Thus, if the Locked and/or Hidden status for a channel is changed in Sat Mode, that status can be applied to the matching IP channel (if any) the next time the product is in IP Mode; and vice versa.

The above-presented description and figures are intended by way of example only and are not intended to limit the present invention in any way except as set forth in the following claims. It is particularly noted that persons skilled in the art can readily combine the various technical aspects of the various elements of the various exemplary embodiments that have been described above in numerous other ways, all of which are considered to be within the scope of the invention.

What is claimed:

1. A method of providing content and data to a receiver, comprising:
   at least one of:
      broadcasting via satellite content and data to a receiver; and
         sending via an IP based communications network content and data to the receiver,
   wherein:
      the content and data provided over the Satellite broadcast enables capabilities of the receiver needed to consume content received by IP delivery, and
      the content and data provided via IP delivery enables capabilities of the receiver needed to consume content received from the satellite broadcast,
   wherein the receiver is a combined receiver arranged to (i) receive and process content and data delivered via a satellite broadcast and (ii) both receive and send data over said IP based communications network;
   wherein when specific content is required to service a receiver function, and that must be requested by the receiver, IP delivery is used; and
   wherein said specific content includes a specific on-demand audio program, a particular album art image to be displayed on the receiver, information describing an audio channel lineup, and weather conditions for a specific locale.

2. The method of claim 1, wherein the selected delivery path to the receiver is such so as to at least one of: optimize a user of the receiver's experience, and minimize costs associated with providing receiver system and end user features relative to delivery of such content over only a satellite or only an IP delivery system.

3. The method of claim 2, wherein for content where it is critical to deliver the content to a receiver with immediacy, IP delivery is used.

4. The method of claim 3, wherein said content responds to a user of the receiver's action or request.

5. The method of claim 2, wherein for content where a steady stream of data is required, Satellite delivery is used.

6. The method of claim 1, wherein said content broadcast via satellite includes one or more of an audio channel for satellite radio, and background updates to delivered data content.

7. The method of claim 1, wherein said content sent via IP delivery includes different content that must be delivered to each receiver or small groups of receivers.

8. The method of claim 7, wherein said content is on-demand audio content.

9. The method of claim 1, wherein said content sent via satellite comprises content that must be identically delivered to one of all receivers and a large group of receivers.

10. The method of claim 1, wherein said information describing an audio channel lineup includes channel names, channel categories, channel descriptions, program guide information for the satellite content, and definitions of convenient channel presets for the satellite content.

11. The method of claim 1, wherein said information describing an audio channel lineup includes information for content delivered (i) exclusively over Satellite, (ii) exclusively over IP, or (iii) over both Satellite and IP.

12. The method of claim 1, wherein for non-interactive content or where link quality of service is critical, satellite delivery is used.

13. The method of claim 1, wherein channel and then playing song information is sent via satellite, and album art is sent via an IP connection, and wherein both streams of information are processed in the receiver and presented seamlessly to a user.

14. The method of claim 1, wherein artist biographies, supplementary artist images, lyrics, and other information synchronized with an audio program are delivered over IP to the receiver.

15. The method of claim 14, wherein information includes at least one of: information for content delivered exclusively over Satellite, information for content delivered exclusively over IP, and information for content delivered over both Satellite and IP.

16. A receiver, comprising: a satellite reception and processing module, arranged to receive and process content and data broadcast via satellite;
   an IP communications module, arranged to send, receive and process content and data via an IP based communications network, and
   a controller, arranged to process both streams of information and present portions of them, as needed, seamlessly to a user.

17. The receiver of claim 16, wherein:
   the content and data provided over the satellite broadcast is processed to enable capabilities of the receiver needed to consume content received by IP delivery, and
   the content and data provided via IP delivery is processed to enable capabilities of the receiver needed to consume content received from the satellite broadcast.

* * * * *